(12) United States Patent
Suh (10) Patent No.: US 7,736,262 B2
(45) Date of Patent: Jun. 15, 2010

(54) POWER TRAIN OF AUTOMATIC TRANSMISSION

(75) Inventor: Hyunseung Suh, Seoul (KR)

(73) Assignee: Hyundai Motor Company, Seoul (KR)

( * ) Notice: Subject to any disclaimer, the term of this patent is extended or adjusted under 35 U.S.C. 154(b) by 340 days.

(21) Appl. No.: 12/014,246

(22) Filed: Jan. 15, 2008

(65) Prior Publication Data

US 2009/0118058 A1    May 7, 2009

(30) Foreign Application Priority Data

Nov. 2, 2007  (KR) ....................... 10-2007-0111599

(51) Int. Cl.
*F16H 3/62* (2006.01)
(52) U.S. Cl. ..................................................... 475/276
(58) Field of Classification Search ....................... None
See application file for complete search history.

(56) References Cited

U.S. PATENT DOCUMENTS 6,723,018 B2 *  4/2004  Hayabuchi et al. .......... 475/276

* cited by examiner

*Primary Examiner*—Dirk Wright
(74) *Attorney, Agent, or Firm*—Morgan, Lewis & Bockius LLP (57) ABSTRACT

The present invention relates to a power train of an automatic transmission that outputs twelve forward speeds and three reverse speeds by operations of first and second input units, first and second output units, and a plurality of friction members that connect operating members of the first and second input units and the first and second output units to an input shaft, other operating members of the first and second input units, and the first and second output units, or a case.

11 Claims, 9 Drawing Sheets

● : operational
○ : operational or nonoperational
× : nonoperational

| GEAR STEP | | C1 | C2 | C3 | C4 | B1 | B2 | B3 | B4 |
|---|---|---|---|---|---|---|---|---|---|
| Forward | 1 | ● | × | × | × | × | × | ● | ● |
| | 2 | ● | × | × | × | ● | × | ● | × |
| | 3 | ● | × | × | ● | × | × | × | ● |
| | 4 | ● | ● | ○ | × | × | × | ● | × |
| | 5 | ● | × | × | × | × | ● | × | ● |
| | 6 | ● | ● | × | ● | ● | × | × | × |
| | 7 | × | ● | × | × | ● | × | ● | × |
| | 8 | ● | × | ○ | ● | × | ● | × | × |
| | 9 | ● | ● | × | × | ● | × | × | × |
| | 10 | × | ● | ○ | ● | × | ● | × | × |
| | 11 | ● | ● | × | × | ● | ● | × | × |
| | 12 | × | × | × | × | × | × | × | × |
| Reverse | R1 | × | × | ● | × | × | × | ● | ● |
| | R2 | × | × | ● | ● | × | × | × | ● |
| | R3 | × | × | ● | × | × | ● | × | ● |

| GEAR STEP | | C1 | C2 | C3 | C4 | B1 | B2 | B3 | B4 |
|---|---|---|---|---|---|---|---|---|---|
| Forward | 1 | ● | × | × | × | × | × | ● | ● |
| | 2 | ● | × | × | × | ● | × | ● | × |
| | 3 | ● | × | × | ● | × | × | × | ● |
| | 4 | ● | ● | ○ | × | × | × | ● | × |
| | | ● | ○ | ● | × | × | × | ● | × |
| | | ○ | ● | ● | × | × | × | ● | × |
| | 5 | ● | × | × | × | × | ● | × | ● |
| | 6 | ● | × | × | ● | ● | × | × | × |
| | 7 | × | ● | × | × | ● | × | ● | × |
| | 8 | ● | ● | ○ | ● | × | × | × | × |
| | | ● | ○ | ● | ● | × | × | × | × |
| | | ○ | ● | ● | ● | × | × | × | × |
| | 9 | ● | × | × | × | ● | ● | × | × |
| | 10 | × | ● | × | ● | ● | × | × | × |
| | 11 | ● | ● | ○ | × | × | ● | × | × |
| | | ● | ○ | ● | × | × | ● | × | × |
| | | ○ | ● | ● | × | × | ● | × | × |
| | 12 | × | ● | × | × | ● | ● | × | × |
| Reverse | R1 | × | × | ● | × | × | × | ● | ● |
| | R2 | × | × | ● | ● | × | × | × | ● |
| | R3 | × | × | ● | × | × | ● | × | ● |

● : operational

○ : operational or nonoperational

× : nonoperational

POWER TRAIN OF AUTOMATIC TRANSMISSION

CROSS-REFERENCE TO RELATED APPLICATION

This application claims priority to and the benefit of Korean Patent Application No. 10-2007-0111599 filed in the Korean Intellectual Property Office on Nov. 2, 2007, the entire contents of which are incorporated herein by reference.

BACKGROUND OF THE INVENTION (a) Field of the Invention

The present invention relates to a multiple speed automatic transmission for a vehicle and more particularly, to a gear train enabling twelve forward speeds and three reverse speeds.

(b) Description of the Related Art

A typical shift mechanism of an automatic transmission utilizes a combination of a plurality of planetary gear sets. A power train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a power train such as durability, efficiency in power transmission, and size depend a lot on the layout of combined planetary gear sets. Therefore, designs for a combining structure of a power train are also under constant investigation.

For a manual transmission, too many speeds cause a driver the inconvenience of excessive manual shifting. However, for an automatic transmission, a transmission control unit automatically executes shifting by controlling the operation of the power train, and therefore more speeds usually implies more merits.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power train of an automatic transmission for a vehicle, which includes four planetary gear sets, four clutches, and four brakes, and realizes twelve forward speeds and three reverse speeds. Using the present invention a vehicle can have better fuel mileage and better performance.

A power train of an automatic transmission according to an exemplary embodiment of the present invention may include a first input unit including a first operating member, a second operating member, and a third operating member; a second input unit including a fourth operating member, a fifth operating member, and a sixth operating member; a first output unit including a seventh operating member, an eighth operating member, and a ninth operating member; a second output unit including a tenth operating member, an eleventh operating member, and a twelfth operating member; and a plurality of friction members that connect operating members of the first and second input units and the first and second output units to an input shaft, other operating members of the first and second input units and the first and second output units, or a case. The first operating member is selectively connected to the input shaft; the second operating member is connected with the sixth operating member, the seventh operating member, and the eleventh operating member; the third operating member is connected to the fifth operating member that is selectively connected to the input shaft or selectively fixed to the case; the fourth operating member is selectively connected to the input shaft or selectively fixed to the case; the ninth operating member is selectively fixed to the case; the tenth operating member is selectively fixed to the case; two operating members of the first output unit are selectively connected or two operating members of the second output unit are selectively connected; and the eighth operating member is connected to the twelfth operating member and outputs twelve forward speeds and three reverse speeds.

A plurality of friction members may include a first clutch that selectively connects the input shaft and the first operating member, a second clutch that selectively connects the input shaft with the third operating member and the fifth operating member, a third clutch that selectively connects the fourth operating member with the input shaft, a fourth clutch that selectively connects two operating members of the first output unit or selectively connects two operating members of the second output unit, a first brake that selectively fixes the fourth operating member to the case, a second brake that selectively fixes the tenth operating member to the case, a third brake that selectively fixes the ninth operating member to the case, and a fourth brake that selectively fixes the third operating member and the fifth operating member to the case.

The first and second input units and the first and second output units may be disposed in sequence of the first input unit, the second input unit, the first output unit, and the second output unit.

The first operating unit may be a first sun gear, the second operating unit may be a first planet carrier, the third operating unit may be a first ring gear, the fourth operating unit may be a second sun gear, the fifth operating unit may be a second planet carrier, the sixth operating unit may be a second ring gear, the seventh operating unit may be a third sun gear, the eighth operating unit may be a third planet carrier, the ninth operating unit may be a third ring gear, the tenth operating unit may be a fourth sun gear, the eleventh operating unit may be a fourth planet carrier, and the twelfth operating unit may be a fourth ring gear.

The fourth clutch may selectively connect the tenth operating member with the eleventh operating member.

The fourth clutch may selectively connect the tenth operating member with the twelfth operating member.

The fourth clutch may selectively connect the eleventh operating member with the twelfth operating member.

The fourth clutch may selectively connect the seventh operating member with the eighth operating member.

The fourth clutch may selectively connect the seventh operating member with the ninth operating member.

The fourth clutch may selectively connect the eighth operating member with the ninth operating member.

Four forward speeds and one reverse speed may be realized by combination of the first input unit and the second input unit, three forward speeds may be realized by combination of the first output unit and the second output unit, and twelve forward speeds and three reverse speeds may be realized by combination of the first input unit, the second input unit, the first output unit and the second output unit.

As described above, the power train of an automatic transmission according to the exemplary embodiments of the present invention may output twelve forward speeds and three reverse speeds by operations of four planetary gear sets, four clutches, and four brakes.

The power train of an automatic transmission according to the exemplary embodiments of the present invention may realize a greater number of shift speeds, so speed ratios of the transmission can be more optimally designed and therefore a vehicle can have better fuel mileage and better performance.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Embodiments of the present invention will hereinafter be described in detail with reference to the accompanying drawings.

As shown in FIG. 1 to FIG. 9, a power train of an automatic transmission according to exemplary embodiments of the present invention includes an input shaft 100, an output gear 200, a transmission case 300, a first input unit PG1, a second input unit PG2, a first output unit PG3, a second output unit PG4, and a plurality of friction members C1, C2, C3, C4, B1, B2, B3, and B4.

Figure 1:
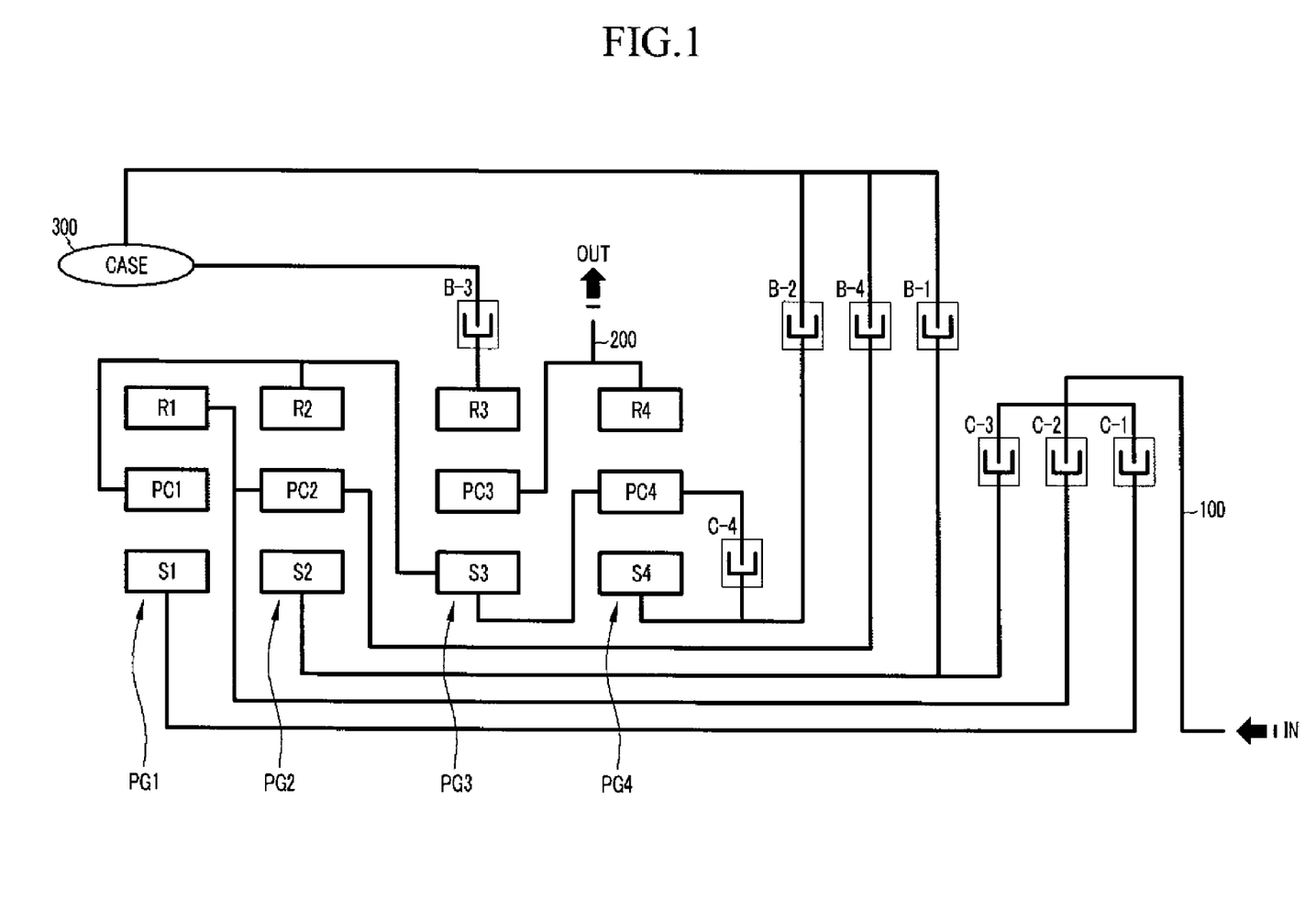
FIG. 1 is a schematic diagram showing a power train of an automatic transmission according to a first exemplary embodiment of the present invention.

The input shaft 100 receives power from an engine (not shown) through a torque converter (not shown).

The output gear 200 outputs power from the power train.

FIG. 1 is a schematic diagram showing a power train of an automatic transmission according to a first exemplary embodiment of the present invention, and referring FIG. 1, the first exemplary embodiment of the present invention will be explained.

The first input unit PG1 includes a first operating member, a second operating member, and a third operating member.

The second input unit PG2 includes a fourth operating member, a fifth operating member, and a sixth operating member.

The first output unit PG3 includes a seventh operating member, an eighth operating member, and a ninth operating member.

The second output unit PG4 includes a tenth operating member, an eleventh operating member, and a twelfth operating member.

The first operating member is selectively connected to the input shaft 100.

The second operating member is connected with the sixth operating member, the seventh operating member, and the eleventh operating member.

The third operating member is connected with the fifth operating member and is selectively connected to the input shaft 100 or selectively fixed to the case 300.

The fourth operating member is selectively connected to the input shaft 100 or selectively fixed to the case 300.

The ninth operating member is selectively fixed to the case 300.

The tenth operating member is selectively fixed to the case 300 or selectively fixed to the eleventh operating member.

The eighth operating member is connected with the twelfth operating member and outputs twelve forward speeds and three reverse speeds.

Hereinafter, the plurality of friction members will be explained.

The first clutch C1 selectively connects the input shaft 100 with the first operating member.

The second clutch C2 selectively connects the input shaft 100 with the third operating member and the fifth operating member.

The third clutch C3 selectively connects the fourth operating member with the input shaft 100.

The fourth clutch C4 selectively connects the tenth operating member with the eleventh operating member.

The first brake B1 selectively fixes the fourth operating member to the case 300.

The second brake B2 selectively fixes the tenth operating member to the case 300.

The third brake B3 selectively fixes the ninth operating member to the case 300.

The fourth brake B4 selectively fixes the third operating member and the fifth operating member to the case 300.

The first and second input units and the first and second output units are disposed in sequence of the first input unit PG1, the second input unit PG2, the first output unit PG3, and the second output unit PG4.

The first and second input units PG1 and PG2 and the first and second output units PG3 and PG4 are combined with simple planetary gear sets.

That is, the first operating unit is the first sun gear S1, the second operating unit is the first planet carrier PC1, the third operating unit is the first ring gear R1, the fourth operating unit is the second sun gear S2, the fifth operating unit is the second planet carrier PC2, the sixth operating unit is the second ring gear R2, the seventh operating unit is the third sun gear S3, the eighth operating unit is the third planet carrier PC3, the ninth operating unit is the third ring gear R3, the tenth operating unit is the fourth sun gear S4, the eleventh operating unit is the fourth planet carrier PC4, and the twelfth operating unit is the fourth ring gear R4.

Hereinafter, referring FIG. 2 and FIG. 3, operations of the power train of an automatic transmission according to the first exemplary embodiment of the present invention will be explained.

Figure 3:
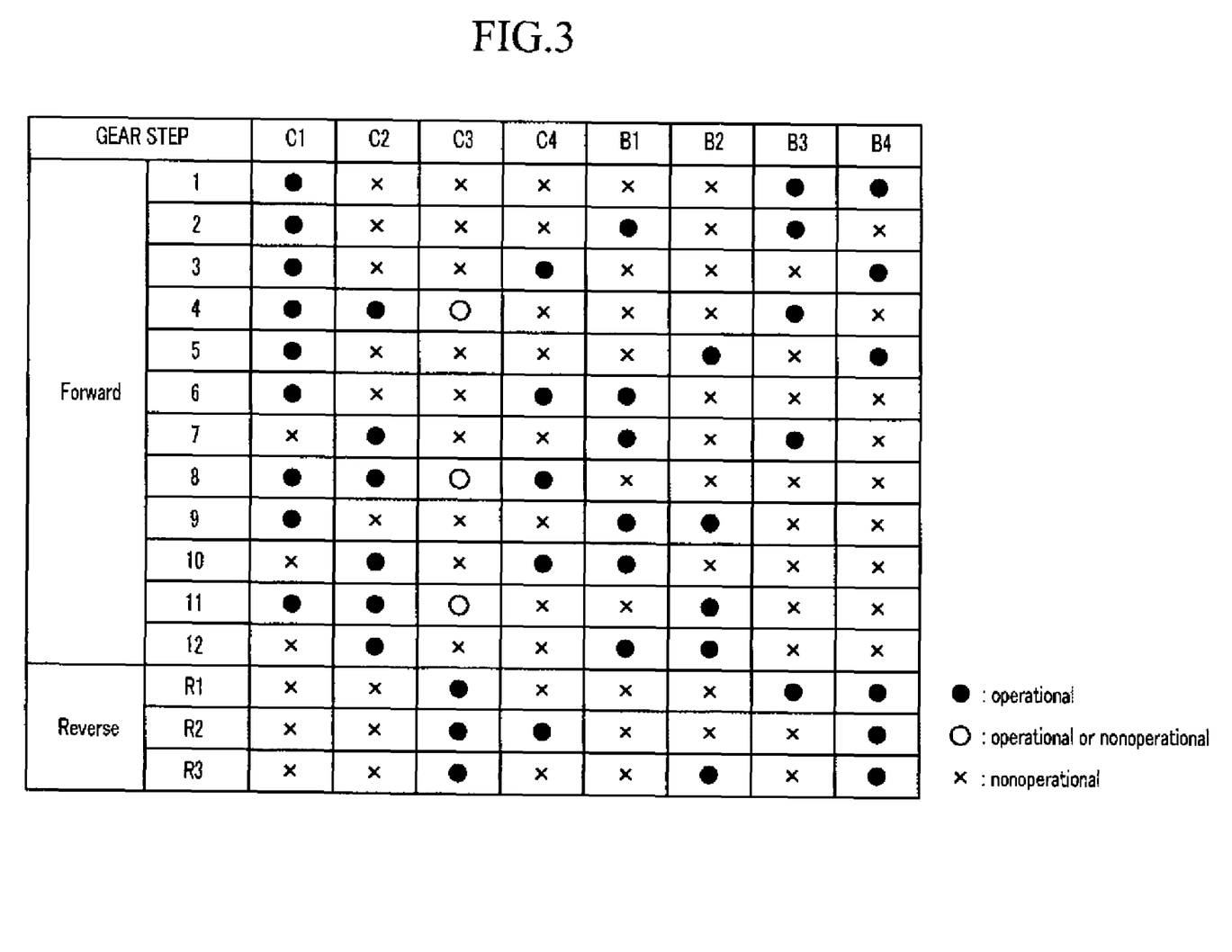
FIG. 3 is an operational chart of the power train of an automatic transmission according to the first exemplary embodiment of the present invention.

In the power train of an automatic transmission according to the first exemplary embodiment of the present invention, as shown in FIG. 3, in the first forward speed 1st the first clutch C1, the third brake B3, and the fourth brake B4 are operated; in the second forward speed 2nd the first clutch C1, the first brake B1, and the third brake B3 are operated; and in the third forward speed 3rd the first clutch C1, the fourth clutch C4, and the fourth brake B4 are operated.

In the fourth forward speed 4th the first clutch C1, the second clutch C2, and the third brake B3 are operated, in the fifth forward speed 5th the first clutch C1, the second brake B2, and the fourth brake B4 are operated, and in the sixth forward speed 6th the first clutch C1, the fourth clutch C4, and the first brake B1 are operated.

In the seventh forward speed 7th the second clutch C2, the first brake B1, and the third brake B3 are operated, in the eighth forward speed 8th the first clutch C1, the second clutch C2, and the fourth clutch C4 are operated, and in the ninth forward speed 9th the first clutch C1, the first brake B1, and the second brake B2 are operated.

In the tenth forward speed 10th the second clutch C2, the fourth clutch C4, and the first brake B1 are operated, in the eleventh forward speed 11th the first clutch C1, the second clutch C2, and the second brake B2 are operated, and in the twelfth forward speed 12th the second clutch C2, the first brake B1, and the second brake B2 are operated.

In the first reverse speed Rev 1st the third clutch C3, the third brake B3, and the fourth brake B4 are operated, in the second reverse speeds Rev 2nd the third clutch C3, the fourth clutch C4, and the fourth brake B4 are operated, and in the third reverse speed Rev 3rd the third clutch C3, the second brake B2, and the fourth brake B4 are operated.

Hereinafter, combinations of the twelve forward speeds and three reverse speeds according to the first exemplary embodiment of the present invention will be explained.

Figure 2:
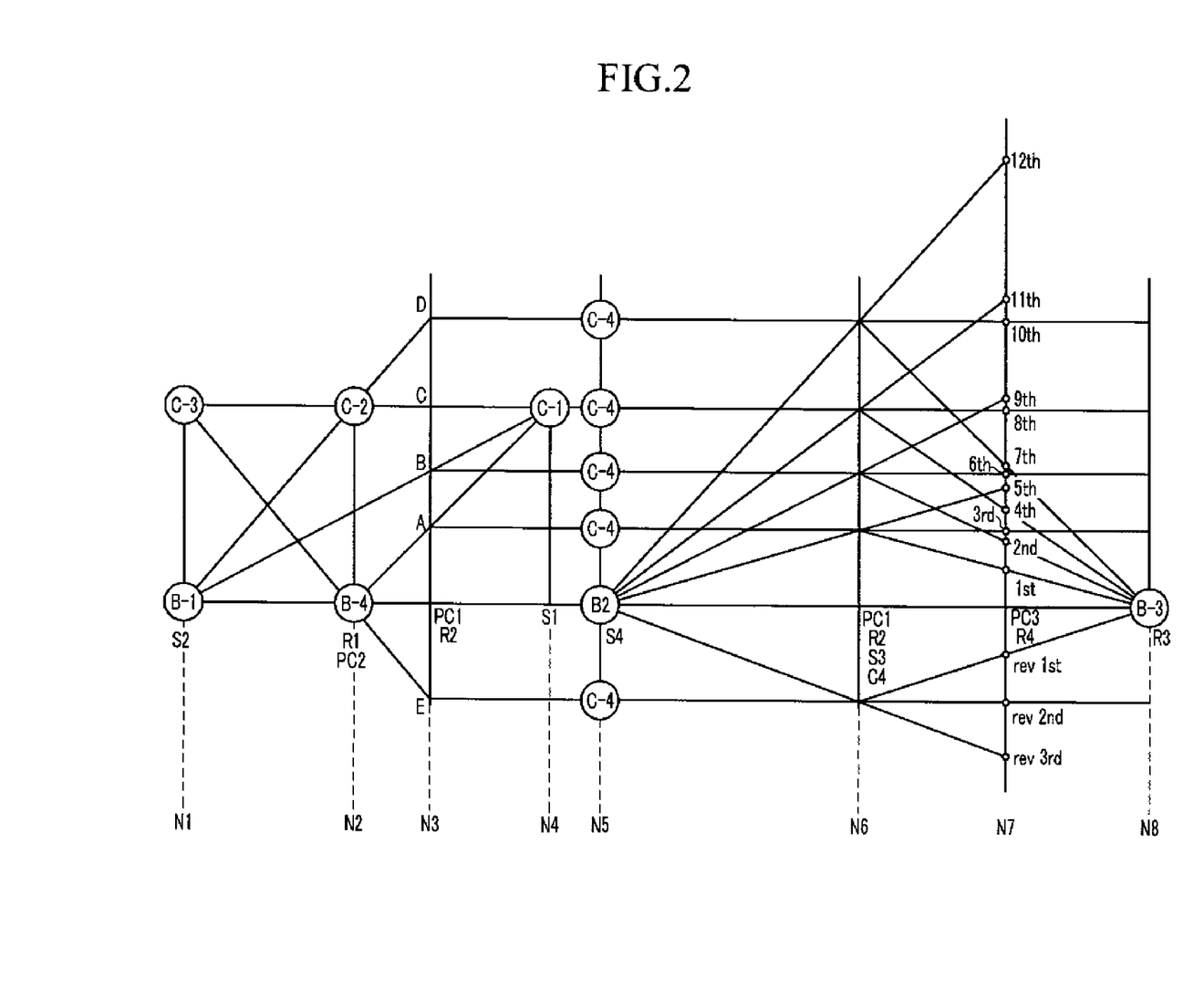
FIG. 2 is a lever diagram showing twelve forward speeds and three reverse speeds according to the first exemplary embodiment of the present invention.

As shown in FIG. 2, the power train of an automatic transmission according to the first exemplary embodiment of the present invention combines four single pinion planetary gear sets. Thus, the power train of an automatic transmission according to the first exemplary embodiment of the present invention may form eight nodes.

The second sun gear S2 forms the first node N1, the first ring gear R1 and the second planet carrier PC2 form the second node N2, the second ring gear R2 and the first planet carrier PC1 form the third node N3, the first sun gear S1 forms the fourth node N4, and the fourth sun gear S4 forms the fifth node N5. The first planet carrier PC1, the second ring gear R2, the third sun gear S3, and the fourth planet carrier PC4 form the sixth node N6, the third planet carrier PC3 and the fourth ring gear R4 form the seventh node N7, and the third ring gear R3 forms the eighth node N8.

The third node N3 and the sixth node N6 are the same node, but they are separately indicated for convenience.

Referring to FIG. 3, each shift mode of the power train according to the first exemplary embodiment of the present invention will be explained.

For convenience A, B, C, D, and E indicate rotation speeds of the first planet carrier respectively, and the C indicates the same rotation speed as that of the input shaft.

In the first forward speed 1st the first clutch C1, the third brake B3, and the fourth brake B4 are operated, the fourth node N4 is connected with the input shaft 100, the second node N2 stops, the third node N3 rotates at A speed, the eighth node N8 stops, and the seventh node N7 outputs the first forward speed 1st.

In the second forward speed 2nd, the first clutch C1, the first brake B1, and the third brake B3 are operated, the fourth node N4 is connected with the input shaft 100, the first node N1 stops, the third node N3 rotates at B speed, the eighth node N8 stops, and the seventh node N7 outputs the second forward speed 2nd.

In the third forward speed 3rd, the first clutch C1, the fourth clutch C4, and the fourth brake B4 are operated, the fourth node N4 is connected with the input shaft, the second node N2 stops, the third node N3 rotates at A speed, and the seventh node N7 outputs the third forward speed 3rd.

In the fourth forward speed 4th, the first clutch C1, the second clutch C2, and the third brake B3 are operated, the second node N2 and the fourth node N4 are connected with the input shaft 100, the third node N3 rotates at C speed, the eighth node N8 stops, and the seventh node N7 outputs the fourth forward speed 4th.

In the fifth forward speed 5th, the first clutch C1, the second brake B2, and the fourth brake B4 are operated, the fourth node N4 is connected with the input shaft 100, the second node N2 stops, the third node N3 rotates at A speed, the fifth node N5 stops, and the seventh node N7 outputs the fifth forward speed 5th.

In the sixth forward speed 6th, the first clutch C1, the fourth clutch C4, and the first brake B1 are operated, the fourth node N4 is connected with the input shaft 100, the first node N1 stops, the third node N3 rotates at B speed, and the seventh node N7 outputs the sixth forward speed 6th.

In the seventh forward speed 7th, the second clutch C2, the first brake B1, and the third brake B3 are operated, the second node N2 is connected with the input shaft 100, the first node N1 stops, the third node N3 rotates at D speed, the eighth node N8 stops, and the seventh node N7 outputs the seventh forward speed 7th.

In the eighth forward speed 8th, the first clutch C1, the second clutch C2, and the fourth clutch C4 are operated, the second node N2 and the fourth node N4 are connected with the input shaft 100, the third node N3 rotates at C speed, and the seventh node N7 outputs the eighth forward speed 8th.

In the ninth forward speed 9th, the first clutch C1, the first brake B1, and the second brake B2 are operated, the fourth node N4 is connected with the input shaft 100, the first node N1 stops, the third node N3 rotates at B speed, the fifth node N5 stops, and the seventh node N7 outputs the ninth forward speed 9th.

In the tenth forward speed 10th, the second clutch C2, the fourth clutch C4, and the first brake B1 are operated, the second node N2 is connected with the input shaft 100, the first node N1 stops, the third node N3 rotates at D speed, and the seventh node N7 outputs the tenth forward speed 10th.

In the eleventh forward speed 11th, the first clutch C1, the second clutch C2, and the second brake B2 are operated, the second node N2 and the fourth node N4 are connected with the input shaft 100, the third node N3 rotates at C speed, the fifth node N5 stops, and the seventh node N7 outputs the eleventh forward speed 11th.

In the twelfth forward speed 12th, the second clutch C2, the first brake B1, and the second brake B2 are operated, the second node N2 is connected with the input shaft 100, the first node N1 stops, the third node N3 rotates at D speed, the first node N1 and the fifth node N5 stop, and the seventh node N7 outputs the twelfth forward speed 12th.

In the first reverse speed REV1, the third clutch C3, the third brake B3, and the fourth brake B4 are operated, the first node N1 is connected with the input shaft 100, the second node N2 stops, the third node N3 rotates at E speed, the eighth node N8 stops, and the seventh node N7 outputs the first reverse speed Rev 1st.

In the second reverse speeds REV2, the third clutch C3, the fourth clutch C4, and the fourth brake B4 are operated, the first node N1 is connected with the input shaft 100, the second node N2 stops, the third node N3 rotates at E speed, and the seventh node N7 outputs the second reverse speed Rev 2nd.

In the third reverse speed REV3, the third clutch C3, the second brake B2, and the fourth brake B4 are operated, the first node N1 is connected with the input shaft 100, the second node N2 stops, the third node N3 rotates at E speed, the fifth node N5 stops, and the seventh node N7 outputs the third reverse speed Rev 3rd.

Four forward speeds and one reverse speed are realized by combination of the first input unit and the second input unit, three forward speeds are realized by combination of the first output unit and the second output unit, and twelve forward speeds and three reverse speeds are realized by combination of the first input unit, the second input unit, the first output unit and the second output unit.

Hereinafter, other exemplary embodiments of the present inventions will be explained. Power trains of an automatic transmission according to other exemplary embodiments of the present inventions have schemes and operations that are similar to the power train of an automatic transmission according to the first exemplary embodiment of the present invention. The differences of the exemplary embodiments of the present inventions will be explained.

Figure 4:
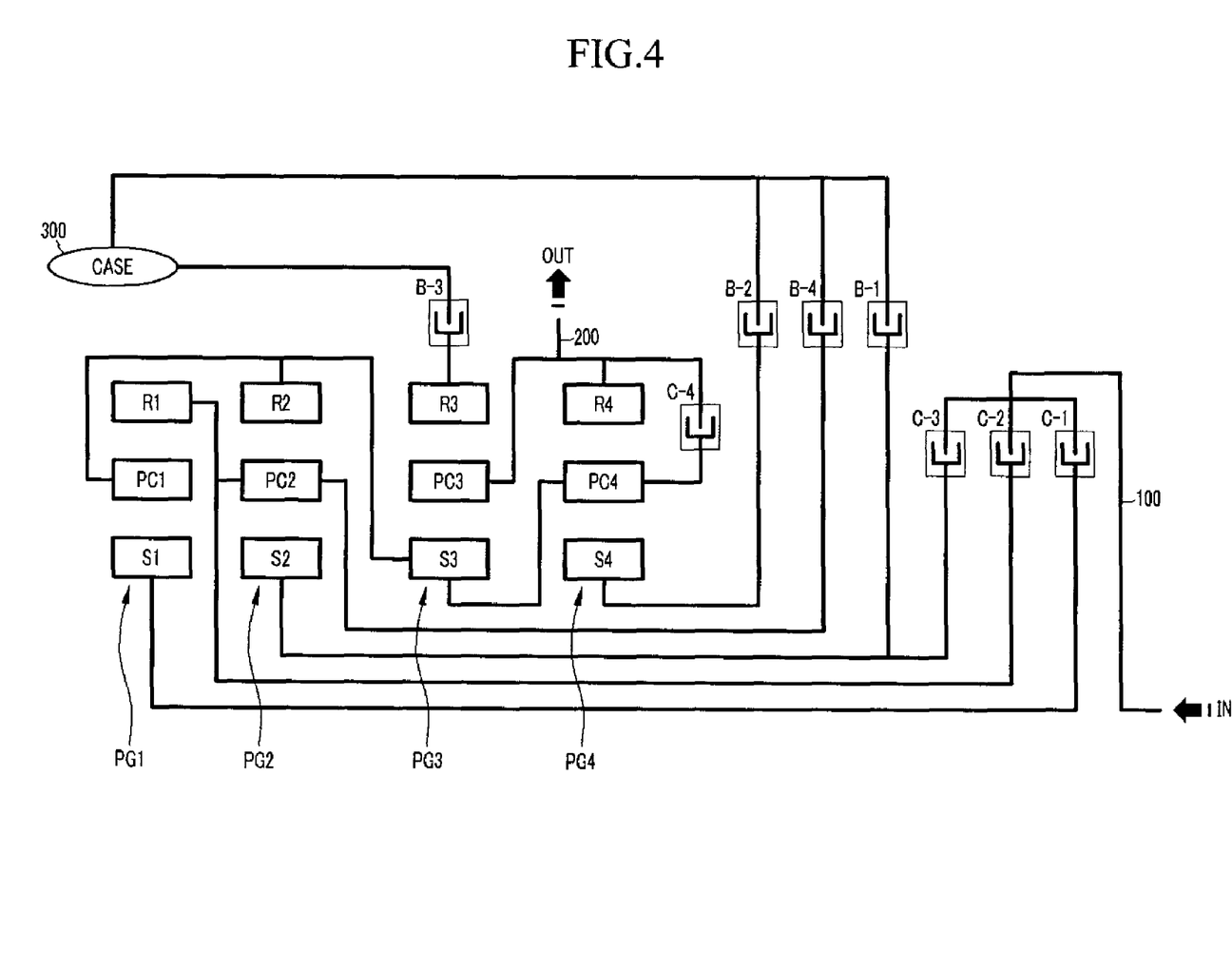
FIG. 4 is a schematic diagram showing a power train of an automatic transmission according to a second exemplary embodiment of the present invention.

FIG. 4 is a schematic diagram showing a power train of an automatic transmission according to a second exemplary embodiment of the present invention.

Compared to the first exemplary embodiment of the present invention in FIG. 1, the fourth clutch C4 selectively connects the eleventh operating member with the twelfth operating member, and the power train of an automatic transmission according to the second exemplary embodiment of the present invention realizes twelve forward speeds and three reverse speeds that are the same as those shown in the lever diagram and the operational chart in FIG. 2 and FIG. 3.

Figure 5:
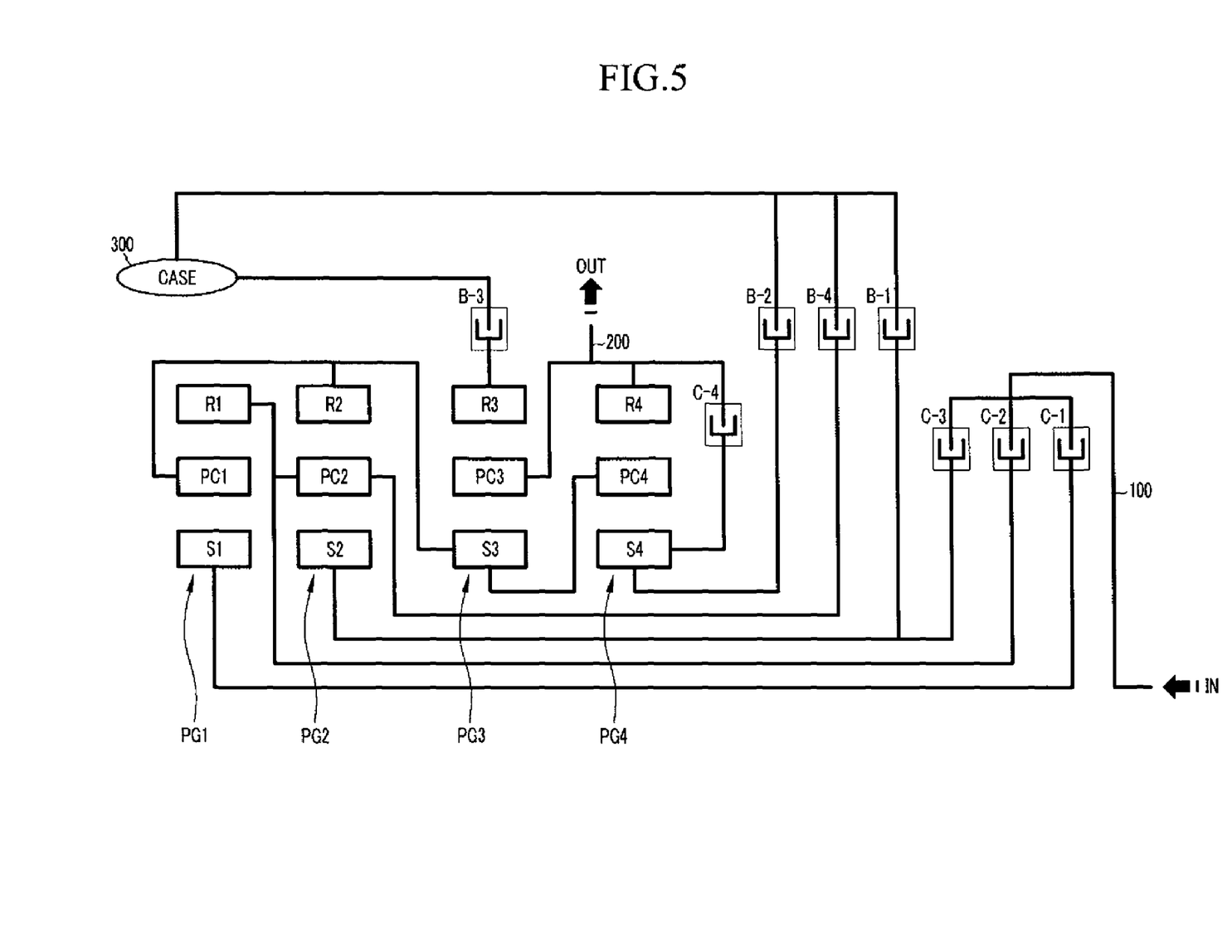
FIG. 5 is a schematic diagram showing a power train of an automatic transmission according to a third exemplary embodiment of the present invention.

FIG. 5 is a schematic diagram showing a power train of an automatic transmission according to a third exemplary embodiment of the present invention.

Compared to the first exemplary embodiment of the present invention in FIG. 1, the fourth clutch C4 selectively connects the tenth operating member with the twelfth operating member, and the power train of an automatic transmission according to the third exemplary embodiment of the present invention realizes twelve forward speeds and three reverse speeds that are the same as those shown in the lever diagram and the operational chart in FIG. 2 and FIG. 3.

Figure 6:
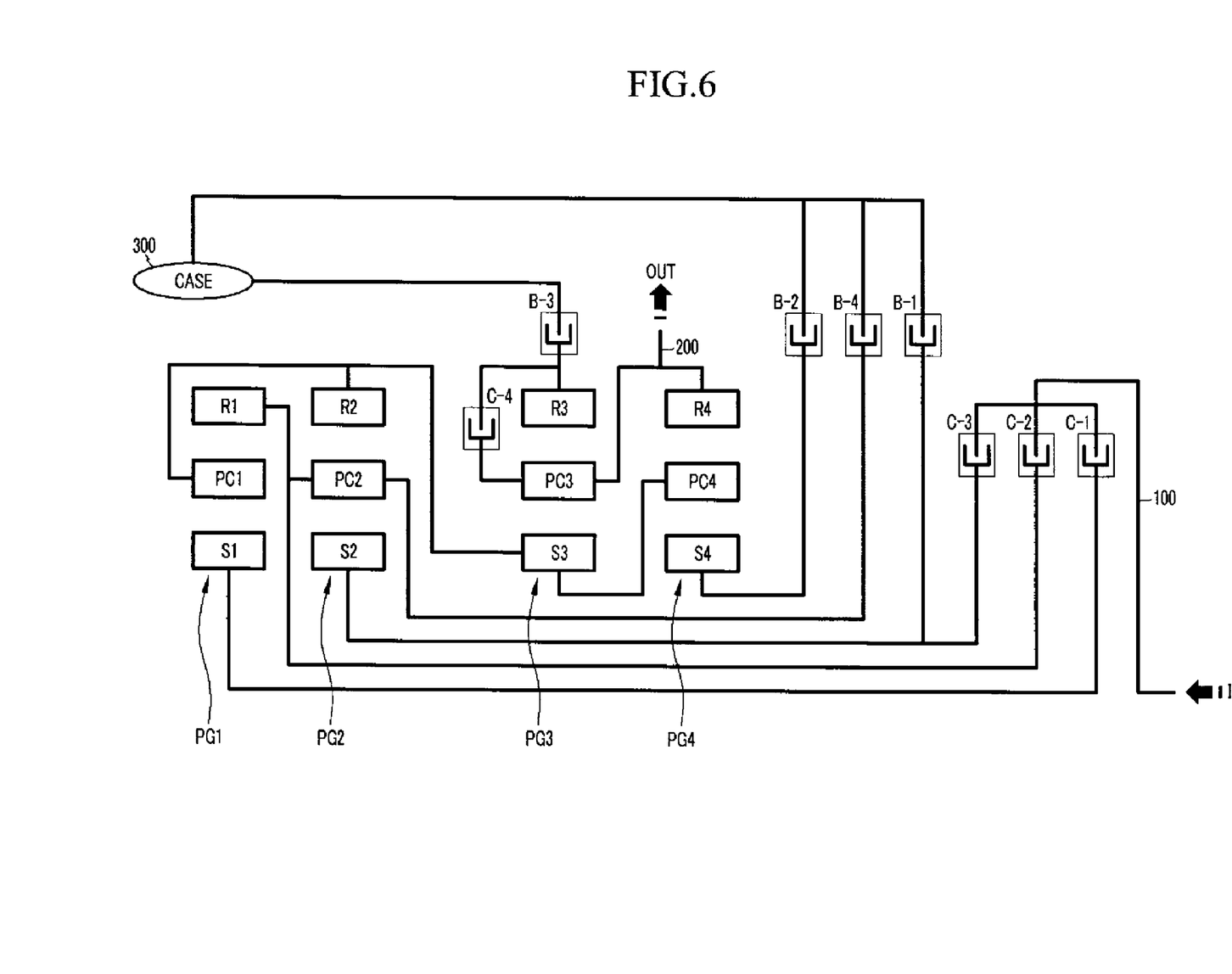
FIG. 6 is a schematic diagram showing a power train of an automatic transmission according to a fourth exemplary embodiment of the present invention.

FIG. 6 is a schematic diagram showing a power train of an automatic transmission according to a fourth exemplary embodiment of the present invention.

Compared to the first exemplary embodiment of the present invention in FIG. 1, the fourth clutch C4 selectively connects the eighth operating member with the ninth operating member, and the power train of an automatic transmission according to the fourth exemplary embodiment of the present invention realizes twelve forward speeds and three reverse speeds that are the same as those shown in the lever diagram and the operational chart in FIG. 2 and FIG. 3.

Figure 7:
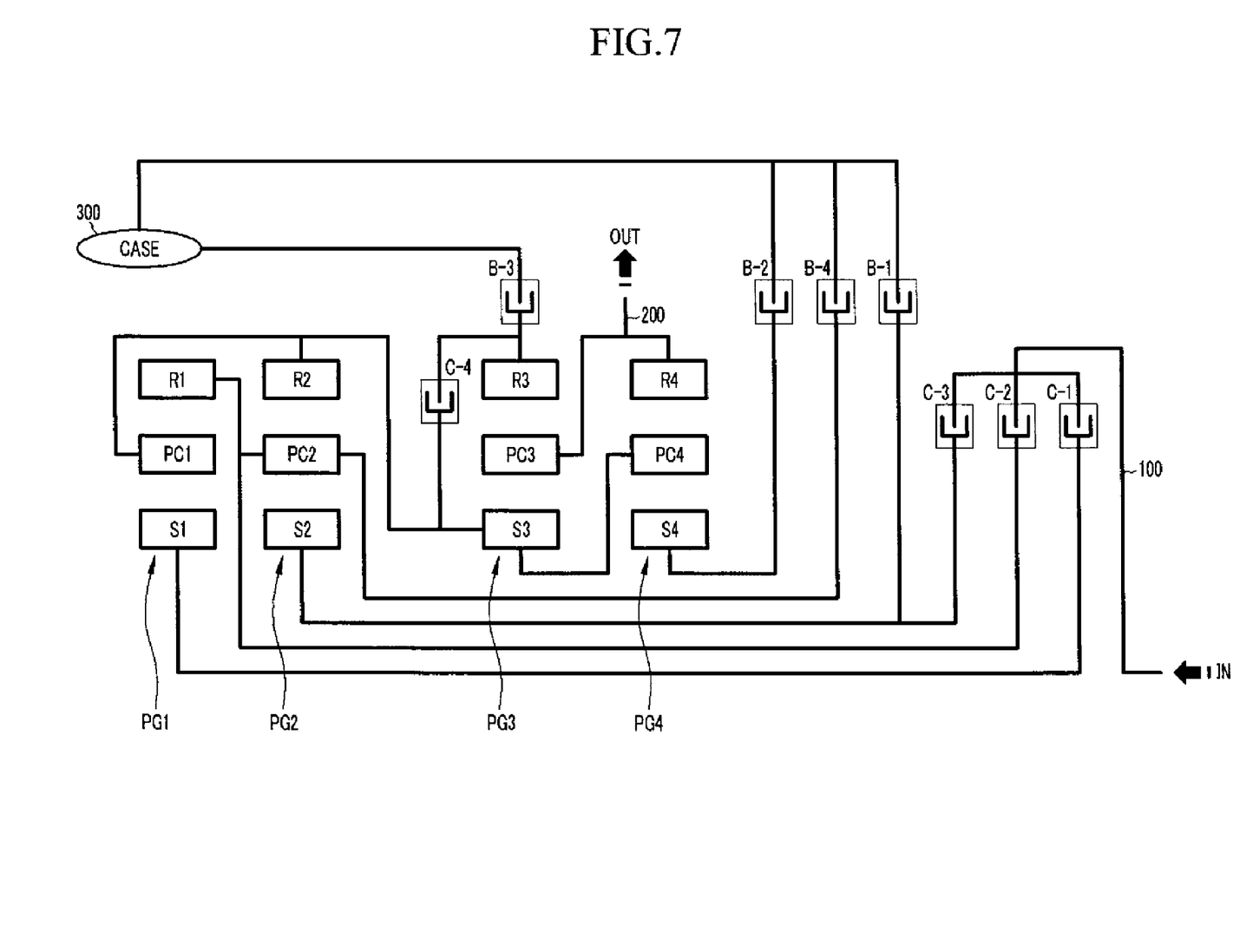
FIG. 7 is a schematic diagram showing a power train of an automatic transmission according to a fifth exemplary embodiment of the present invention.

FIG. 7 is a schematic diagram showing a power train of an automatic transmission according to a fifth exemplary embodiment of the present invention.

Compared to the first exemplary embodiment of the present invention in FIG. 1, the fourth clutch C4 selectively connects the seventh operating member with the ninth operating member, and the power train of an automatic transmission according to the fifth exemplary embodiment of the present invention realizes twelve forward speeds and three reverse speeds that are the same as those shown in the lever diagram and the operational chart in FIG. 2 and FIG. 3.

Figure 8:
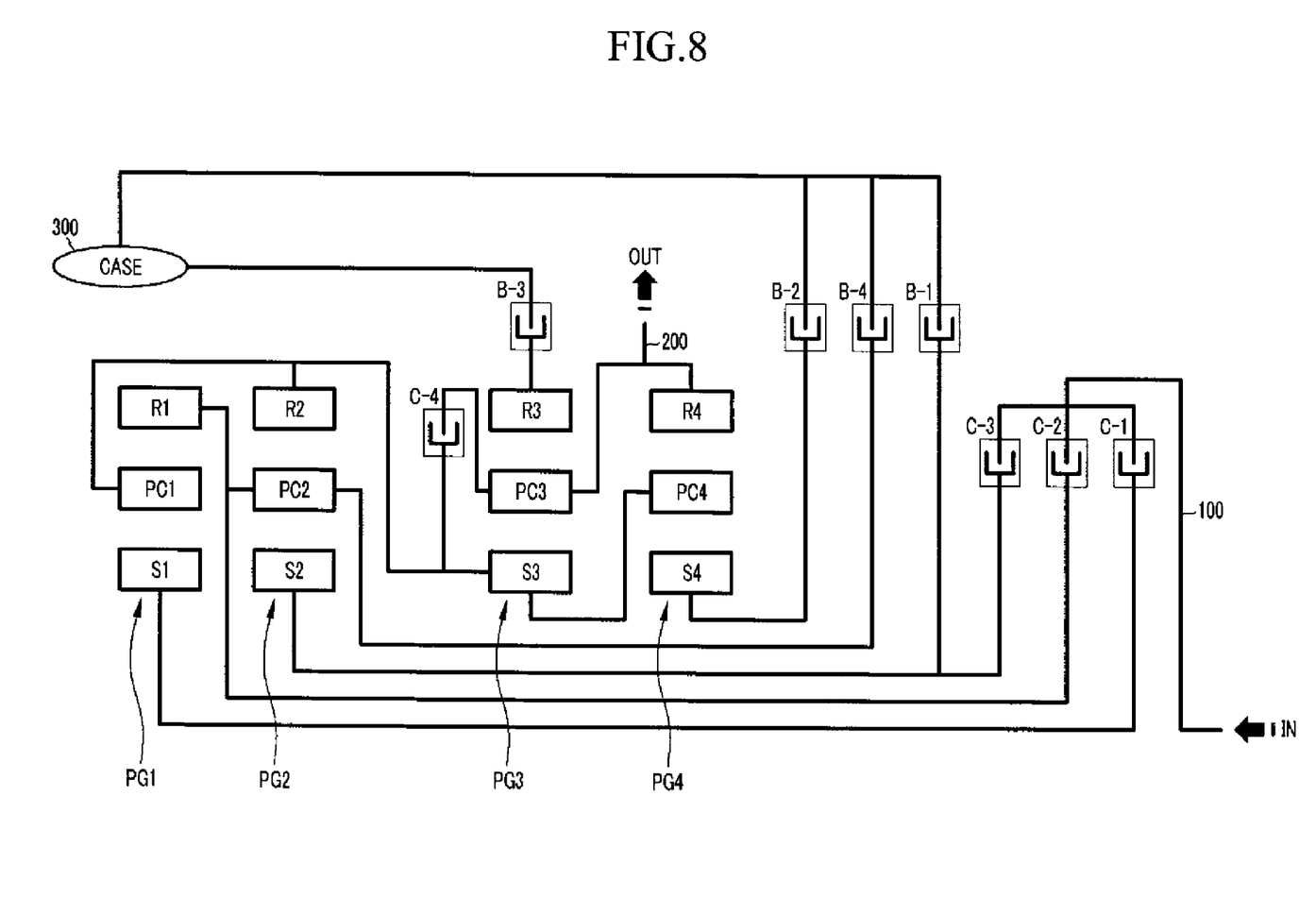
FIG. 8 is a schematic diagram showing a power train of an automatic transmission according to a sixth exemplary embodiment of the present invention.

FIG. 8 is a schematic diagram showing a power train of an automatic transmission according to a sixth exemplary embodiment of the present invention.

Compared to the first exemplary embodiment of the present invention in FIG. 1, the fourth clutch C4 selectively connects the seventh operating member with the eighth operating member, and the power train of an automatic transmission according to the sixth exemplary embodiment of the present invention realizes twelve forward speeds and three reverse speeds that are the same as those shown in the lever diagram and the operational chart in FIG. 2 and FIG. 3.

That is, the power train of an automatic transmission according to the exemplary embodiments of the present invention as shown in FIG. 1 and FIG. 4 to FIG. 8 selectively connects two operating members of the first output unit PG3 or selectively connects two operating members of the second output unit PG4.

Figure 9:
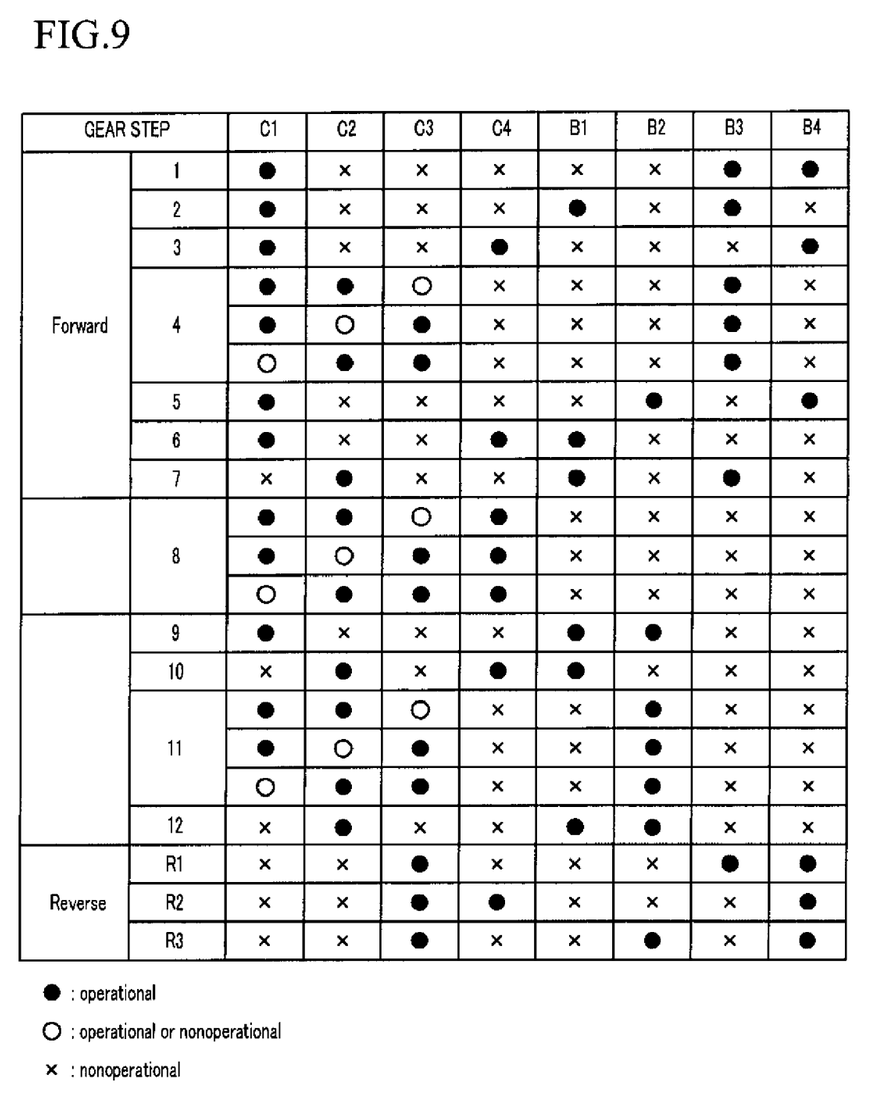
FIG. 9 is an operational chart of the power train of an automatic transmission according to each exemplary embodiments of the present invention.

FIG. 9 is an operational chart of the power train of an automatic transmission according to each exemplary embodiments of the present invention.

As shown in FIG. 9, the fourth forward speed, the eighth forward speed, and the eleventh forward speed can be realized by operations of friction elements other than those shown in the lever diagram in FIG. 2.

The friction members can be optimally selected according to disposition of the friction members, scheme of hydraulic pressure control lines, and so on.

In FIG. 3 and FIG. 9, the mark of "o" indicates that the friction member can be both operated and non-operated, and that does not effect the operation of the power train according to the exemplary embodiments of the present invention. Also, the operation of the friction members can be optimally selected according to disposition of the friction members, scheme of hydraulic pressure control lines, and so on.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
    a first input unit including a first operating member, a second operating member, and a third operating member;
    a second input unit including a fourth operating member, a fifth operating member, and a sixth operating member;
    a first output unit including a seventh operating member, an eighth operating member, and a ninth operating member;
    a second output unit including a tenth operating member, an eleventh operating member, and a twelfth operating member; and
    a plurality of friction members that connect operating members of the first and second input units and the first and second output units to an input shaft, and other operating member of the first and second input units and the first and second output units to a case,
    wherein the first operating member is selectively connected to the input shaft,
    the second operating member is connected with the sixth operating member, the seventh operating member, and the eleventh operating member,
    the third operating member is connected to the fifth operating member that is selectively connected to the input shaft or selectively fixed to the case,
    the fourth operating member is selectively connected to the input shaft or selectively fixed to the case,
    the ninth operating member is selectively fixed to the case,
    the tenth operating member is selectively fixed to the case,
    two operating members of the first output unit are selectively connected or two operating members of the second output unit are selectively connected, and
    the eighth operating member is connected to the twelfth operating member and outputs twelve forward speeds and three reverse speeds.

2. The power train of an automatic transmission of claim 1, wherein the plurality of friction members comprise:
    a first clutch that selectively connects the input shaft and the first operating member;
    a second clutch that selectively connects the input shaft with the third operating member and the fifth operating member;
    a third clutch that selectively connects the fourth operating member with the input shaft;
    a fourth clutch that selectively connects two operating members of the first output unit or selectively connects two operating members of the second output unit;
    a first brake that selectively fixes the fourth operating member to the case;
    a second brake that selectively fixes the tenth operating member to the case;
    a third brake that selectively fixes the ninth operating member to the case; and
    a fourth brake that selectively fixes the third operating member and the fifth operating member to the case.

3. The power train of an automatic transmission of claim 2, wherein the first and second input units and the first and second output units are disposed in sequence of the first input unit, the second input unit, the first output unit, and the second output unit.

4. The power train of an automatic transmission of claim 3, wherein
    the first operating unit is a first sun gear;
    the second operating unit is a first planet carrier;
    the third operating unit is a first ring gear;
    the fourth operating unit is a second sun gear;
    the fifth operating unit is a second planet carrier;
    the sixth operating unit is a second ring gear;
    the seventh operating unit is a third sun gear;
    the eighth operating unit is a third planet carrier;
    the ninth operating unit is a third ring gear;
    the tenth operating unit is a fourth sun gear;
    the eleventh operating unit is a fourth planet carrier; and
    the twelfth operating unit is a fourth ring gear.

5. The power train of an automatic transmission of claim 4, wherein the fourth clutch selectively connects the tenth operating member with the eleventh operating member.

6. The power train of an automatic transmission of claim 4, wherein the fourth clutch selectively connects the tenth operating member with the twelfth operating member.

7. The power train of an automatic transmission of claim 4, wherein the fourth clutch selectively connects the eleventh operating member with the twelfth operating member.

8. The power train of an automatic transmission of claim 4, wherein the fourth clutch selectively connects the seventh operating member with the eighth operating member.

9. The power train of an automatic transmission of claim 4, wherein the fourth clutch selectively connects the seventh operating member with the ninth operating member.

10. The power train of an automatic transmission of claim 4, wherein the fourth clutch selectively connects the eighth operating member with the ninth operating member.

11. The power train of an automatic transmission of claim 1, wherein four forward speeds and one reverse speed are realized by combination of the first input unit and the second input unit, three forward speeds are realized by combination of the first output unit and the second output unit, and twelve forward speeds and three reverse speeds are realized by combination of the first input unit, the second input unit, the first output unit and the second output unit.

* * * * *